US010037708B2

(12) United States Patent
Ming et al.

(10) Patent No.: US 10,037,708 B2
(45) Date of Patent: Jul. 31, 2018

(54) METHOD AND SYSTEM FOR ANALYZING EXAM-TAKING BEHAVIOR AND IMPROVING EXAM-TAKING SKILLS (71) Applicant: Konica Minolta Laboratory U.S.A., Inc., San Mateo, CA (US)

(72) Inventors: Wei Ming, Cupertino, CA (US); Yibin Tian, Menlo Park, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 600 days.

(21) Appl. No.: 14/230,577

(22) Filed: Mar. 31, 2014

(65) Prior Publication Data
US 2015/0279220 A1 Oct. 1, 2015

(51) Int. Cl.
G09B 7/00 (2006.01)
(52) U.S. Cl.
CPC ........................................ G09B 7/00 (2013.01)
(58) Field of Classification Search
CPC .................................... G09B 3/00; G09B 7/00
USPC ................................................. 434/308, 350
See application file for complete search history.

(56) References Cited

U.S. PATENT DOCUMENTS

| 6,288,753 | B1 * | 9/2001 | DeNicola | G09B 5/06 |
| | | | | 348/14.01 |
| 6,302,698 | B1 | 10/2001 | Ziv-El | |
| 6,349,001 | B1 | 2/2002 | Spitzer | |
| 7,013,009 | B2 | 3/2006 | Warren | |
| 7,401,918 | B2 | 7/2008 | Howell et al. | |
| 8,713,130 | B2 * | 4/2014 | Logan | G09B 7/00 |
| | | | | 434/362 |
| 9,439,592 | B2 * | 9/2016 | Stack | A61B 3/113 |
| 2003/0087223 | A1 * | 5/2003 | Walker | G09B 7/02 |
| | | | | 434/353 |
| 2003/0180703 | A1 * | 9/2003 | Yates | G09B 7/00 |
| | | | | 434/353 |
| 2007/0117082 | A1 | 5/2007 | Winneg et al. | |
| 2007/0117083 | A1 * | 5/2007 | Winneg | G09B 7/00 |
| | | | | 434/350 |

(Continued)

FOREIGN PATENT DOCUMENTS

| JP | 2011-109462 A | 6/2011 |
| JP | 2011-191767 A | 9/2011 |
| WO | 02/03358 A1 | 1/2002 |

OTHER PUBLICATIONS

International Search Report and Written Opinion of the International Searching Authority dated Jul. 1, 2015 in corresponding International Patent Application No. PCT/US15/22681 (10 pages).

(Continued)

Primary Examiner — Thomas Hong
(74) Attorney, Agent, or Firm — Buchanan Ingersoll & Rooney PC (57) ABSTRACT A method, a computer program product, and a system for analyzing exam-taking behavior and improving exam-taking skills are disclosed, the method includes obtaining a student answering sequence and timing to an examination having a series of questions; comparing the student answering sequence and timing with results from a statistic analysis of the examination obtained from a plurality of students; and identifying an abnormality in the student answering sequence and timing according to the comparison.

20 Claims, 6 Drawing Sheets

(56) References Cited

U.S. PATENT DOCUMENTS

| | | | |
|---|---|---|---|
| 2009/0035740 A1* | 2/2009 | Reed | G09B 23/288 |
| | | | 434/265 |
| 2010/0279265 A1 | 11/2010 | Heffernan | |
| 2011/0207108 A1 | 8/2011 | Dorman | |
| 2011/0223576 A1* | 9/2011 | Foster | G09B 7/02 |
| | | | 434/362 |
| 2012/0034584 A1 | 2/2012 | Logan et al. | |
| 2012/0077176 A1* | 3/2012 | Foster | G06F 11/3664 |
| | | | 434/362 |
| 2012/0105613 A1 | 5/2012 | Weng et al. | |
| 2013/0120595 A1 | 5/2013 | Roach et al. | |
| 2013/0219443 A1 | 8/2013 | Argyropoulos et al. | |
| 2013/0308099 A1* | 11/2013 | Stack | A61B 3/113 |
| | | | 351/209 |
| 2014/0030686 A1 | 1/2014 | Stambaugh et al. | |
| 2014/0240507 A1* | 8/2014 | Hsu | G06Q 10/10 |
| | | | 348/159 |
| 2014/0272882 A1* | 9/2014 | Kaufman | G09B 5/065 |
| | | | 434/308 |
| 2015/0044649 A1* | 2/2015 | Voss | G06K 9/00315 |
| | | | 434/236 |
| 2015/0044657 A1* | 2/2015 | Dalal | G09B 5/02 |
| | | | 434/308 |
| 2015/0077259 A1* | 3/2015 | Kumar | G09B 7/00 |
| | | | 340/573.1 |

OTHER PUBLICATIONS

Kolsch, M. et al., "Robust Hand Detection", pp. 1-6.
Kasai, I. et al., "A Forgettable Near Eye Display", IEEE, pp. 115-118 (2000).
Wienecke, M. et al., "Video-Based Whiteboard Reading", International Journal on Document Analysis and Recognition Manuscript, pp. 1-20.
Miksik, O. et al., "Evaluation of Local Detectors and Descriptors for Fast Feature Matching", 21st International Conference on Pattern Recognition, pp. 2681-2684 (Nov. 11-15, 2012).
Liebowitz, D. et al., "Metric Rectification for Perspective Images of Planes", Robotics Research Group, pp. 1-7.
Jagannathan, L. et al., "Perspective Correction Methods for Camera-Based Document Analysis", International Institute of Information Technology, pp. 148-154.

* cited by examiner

METHOD AND SYSTEM FOR ANALYZING EXAM-TAKING BEHAVIOR AND IMPROVING EXAM-TAKING SKILLS

FIELD

The present application relates to a method and system for analyzing one or more students during classroom activities, and more particularly, for example, to a method and system for monitoring exam taking of one or more students, analyzing exam-taking behavior and assisting teachers to identify potential learning issues and providing advice in connection with skills associated with learning and taking exams.

BACKGROUND

Though computerized examinations (or "exams") have been widely utilized in education, its high cost, complex preparation and constraint of standardized test format severely limit its adoption by schools. As a result, paper-based exams are still a preferred choice for evaluating student learning by many teachers. For example, paper-based exams can allow teachers to gauge a student's understanding of certain topics based on final answers to the related questions. However, a lot of information is lost in the final answers. For example, the final answers cannot convey how long it takes students to finish a question and how each student analyzes and answer challenging questions.

SUMMARY

In consideration of the above issues, it would be desirable to have a method and system for analyzing classroom activities of one or more students, for example, during the taking of an exam, which can address some of the limitations set forth above.

In accordance with an exemplary embodiment, a method for analyzing exam-taking behavior and improving exam-taking skills is disclosed, the method comprising: obtaining a student answering sequence and timing to an examination having a series of questions; comparing the student answering sequence and timing with results from a statistic analysis of the examination obtained from a plurality of students; and identifying an abnormality in the student answering sequence and timing according to the comparison.

In accordance with an exemplary embodiment, a computer program product comprising a non-transitory computer readable medium having a computer readable code embodied therein for analyzing exam-taking behavior and improving exam-taking is disclosed, the computer readable program code configured to execute a process, which includes the steps of: obtaining a student answering sequence and timing to an examination having a series of questions; comparing the student answering sequence and timing with results from a statistic analysis of the examination obtained from a plurality of students; and identifying an abnormality in the student answering sequence and timing according to the comparison.

In accordance with an exemplary embodiment, a system for analyzing exam-taking behavior and improving exam-taking skills the system comprising: at least one multi-functional device configured to obtain a student a student answering sequence and timing to an examination having a series of questions and a computer configured to: compare the student answering sequence and timing with results from a statistic analysis of the examination obtained from a plurality of students; and identify an abnormality in the student answering sequence and timing according to the comparison.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

In accordance with an exemplary embodiment, a system and method is disclosed that can monitor and analyze exam-taking progress of students when they take paper exams using videos from front-facing video cameras on their multi-functional devices (MFDs). In addition, the system and method can also analyze all audios from microphones, and movement signals from motion sensors, and send warning signals to the teacher if abnormal behavior is detected in the exam room.

Figure 1:
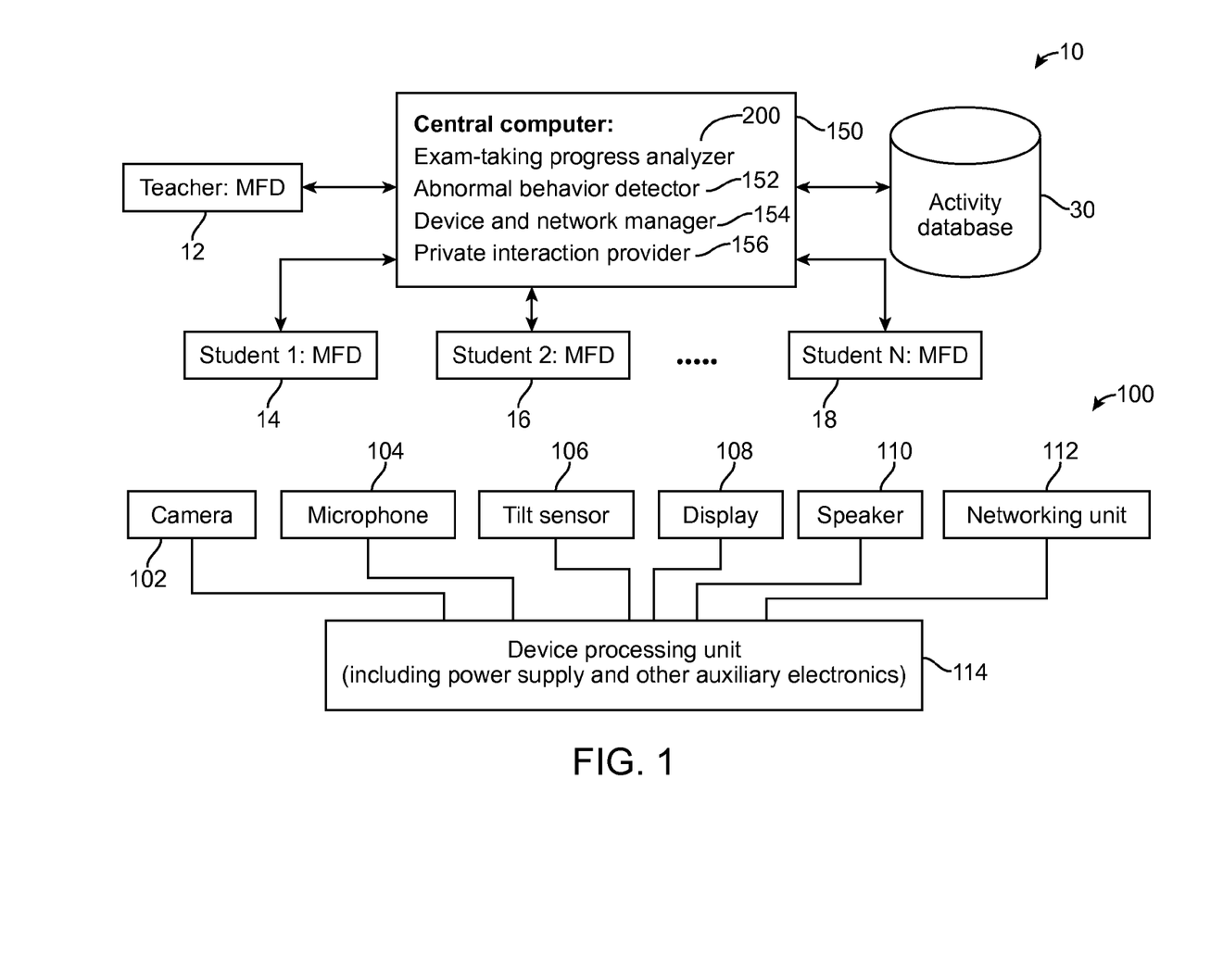
FIG. 1 is an illustration of a system for analyzing exam-taking behavior and improving exam-taking skills in accordance with an exemplary embodiment.

FIG. 1 is an illustration of a system 10 for analyzing exam-taking behavior and improving exam-taking skills in accordance with an exemplary embodiment. As shown in FIG. 1, the system 10 can include a plurality of multi-functional devices (MFDs) 100 that can be configured to be worn by teachers and students. In accordance with an exemplary embodiment, the multi-functional devices (MFDs) 100 can be configured to be wirelessly connected and managed by a computer 150, for example, a central computer, in a classroom or classroom-like setting. For example, the classroom-like setting can include at least one teacher 12, and a plurality of students 14, 16, 18, for example, student 1, student 2, . . . student N.

In accordance with an exemplary embodiment, the central computer 150 can be configured to analyze and store outputs from each of the plurality of MFDs 100 to a local or remote activity database 30. The activity database 30 is preferably part of the computer 150, however, the activity database 30 can also be a separate server, which is in communication with the computer 150. The computer 150 can include, for example, a CPU (Central Processing Unit), a RAM (Random Access Memory), a ROM (Read Only Memory), and an operating system (OS).

In accordance with an exemplary embodiment, each of the plurality of MFDs 100 can be equipped with, for example, a front-facing camera 102, a microphone 104, a tilt sensor or accelerometer 106, a display 108, a speaker 110, a wireless communication unit (or networking unit) 112, and a device processing unit 114. The device processing unit 114 can include, for example, a power supply and other auxiliary electronics components. The wireless communication unit or networking unit 112, for example, can be a radio frequency (RF) and/or infrared (IR) transmission. In accordance with an exemplary embodiment, the MFD 100 can be a light-weighted head-mounted device, for example, Google® Glass.

In accordance with an exemplary embodiment, the system 10 can monitor and analyze progress of students during exams, for example paper exams and/or computerized exams, by using videos from front-facing video cameras 102 on the multi-functional devices (MFDs) 100 of each of the students 14, 16, 18. In addition, the system 10 can also analyze audio segments and clips obtained from microphones 104 on the multi-functional devices, and/or movement signals from motion or tilts sensors 106, and can send warning signals to a teacher 12, if abnormal behavior is detected in the exam room.

In accordance with an exemplary embodiment, the system 10 can be configured to provide an exam or exam-taking progress analyzer 200, which is configured to analyze video obtained from each front-facing video camera 102 to track how long a student 14, 16, 18 spends on each question, and to compare each student's progress with a standard or normal, for example, average time taken to answer the respective questions. The system 10 can also include an exam taking behavior analyzer 700, which is configured to obtain statistics on exam taking behaviors of a group of student and providing instructions to both students and teachers on improving exam taking skills. The system 10 can also provide an abnormal behavior detector 152 that can be configured to analyze information from video (i.e., camera 102), audio (i.e., microphone 104), and/or motion sensor (i.e., tilt sensor 106) to determine abnormal student behavior patterns, and send a warning to the teacher 12 to prevent cheating. In addition, the computer 150 can be equipped with a device and network manager 154 and/or a private interaction provider 156. The device and network manager 154 can be configured to receive wireless signals from each of the plurality of MFDs 100. In accordance with an exemplary embodiment, private interactions between students 14, 16, 18 and the teacher 12 can be supported with the private interaction provider 156.

Figure 2A:
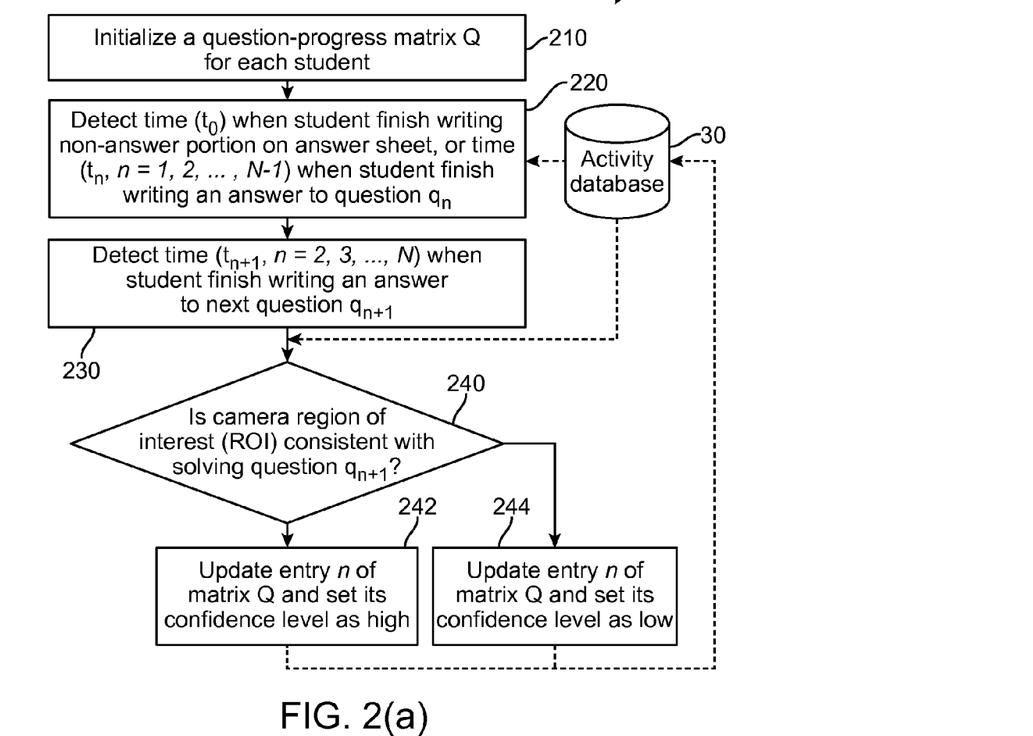
FIG. 2(a) is a workflow of an exam-taking progress analyzer for an individual in accordance with an exemplary embodiment.

FIG. 2(a) is a workflow of an exam-taking progress analyzer 200 for an individual in accordance with an exemplary embodiment, which can be executed on each of the MFDs 100 and/or on the central computer 150. As shown in FIG. 2(a), in step 210, a question-progress matrix (Q) for each student is initialized. In step 220, a detection time ($t_0$) is obtained for when a student finishes writing a non-answer portion on answer sheet, or time ($t_n$, n=1, 2 . . . N−1) when student finish writing an answer to question $q_n$. In step 230, the system 200 can be configured to detect time ($t_{n+1}$, n=2, 3 . . . N) when student finish writing an answer to next question $q_{n+1}$. In step 240, the system is configured to determine if a camera region of interest (ROI) is consistent with solving question $q_{n+1}$. In step 242, if the camera ROI is consistent, an updated entry n of matrix Q is made and the confidence level can be set as high. If the camera ROI is inconsistent, in step 244, an update entry n of matrix Q can be made, and the confidence level can be set as low.

Figure 2B:
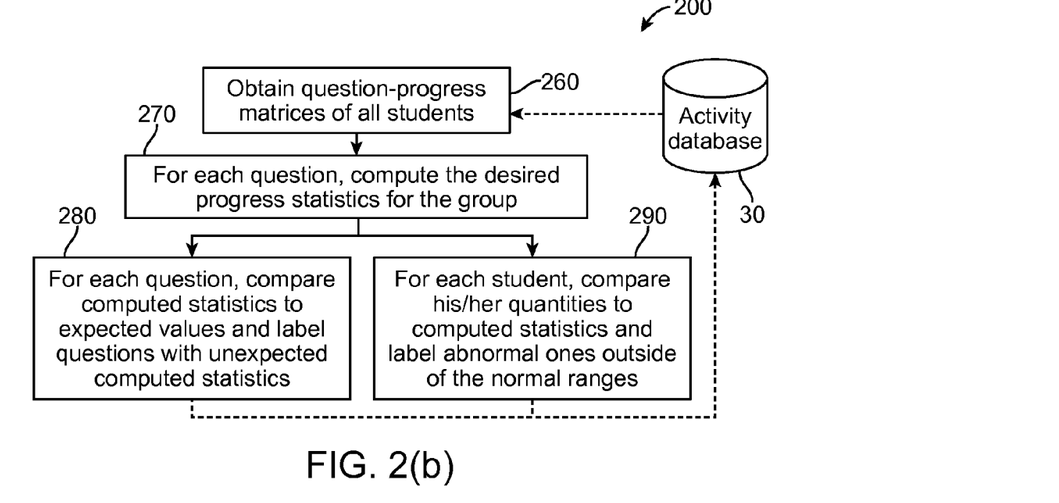
FIG. 2(b) is a workflow of the exam-taking progress analyzer for a group or plurality of students.

FIG. 2(b) is a workflow of the exam-taking progress analyzer 200 for a group of students and/or individuals in accordance with an exemplary embodiment. As shown in FIG. 2(b), in step 260, question-progress matrices of each of the students is obtained. In step 270, for each question, the desired progress statistics for the group is computed. In step 280, for each question, computed statistics are compared to expected values and questions with unexpected computed statistics are labeled or identified. In step 290, for each student, his/her quantities can be compared to computed statistics and label abnormal ones are labeled or identified as being outside of the normal ranges.

In accordance with an exemplary embodiment, the exam taking progress analyzer 200 can be configured in step 290 to obtain a student's answer sequence and obtain the time spent on each question. For each question, a determination or check can be made if the time spent on each of the questions is longer than an average for the class or expected time, for example, a predefined time limit or threshold. If the time spent is longer than the predefined time limit or threshold, a note or message can be generated for the teacher or instructor instructing the teacher or instruction to additional advice or instructions to the student and/or class on each of the questions in which the time spent exceeded the predefined time limit or threshold. A check can also be made if the pattern of answering questions is unusual, for example, going back and forth frequently from one or more questions. If the pattern of answering questions is abnormal, a note or message can be generated that the student should be instructed on test strategy. The analyzer 200 can also check if both questions and answers are reviewed before submission of the examination to the teacher. For example, if no review of questions and answers is made before submission of the examination, a note or message can be generated for the teacher to instruct the student on test strategy, which can include reviewing the questions and answers.

In accordance with an exemplary embodiment, the analyzer 200 can also be used to a group of students to get the statistic results. For example, if common issue was found, the instructor or teacher can notified that he or she needs to review his/her teaching on related topics and provide or give further instructions to entire class.

Figure 3A:
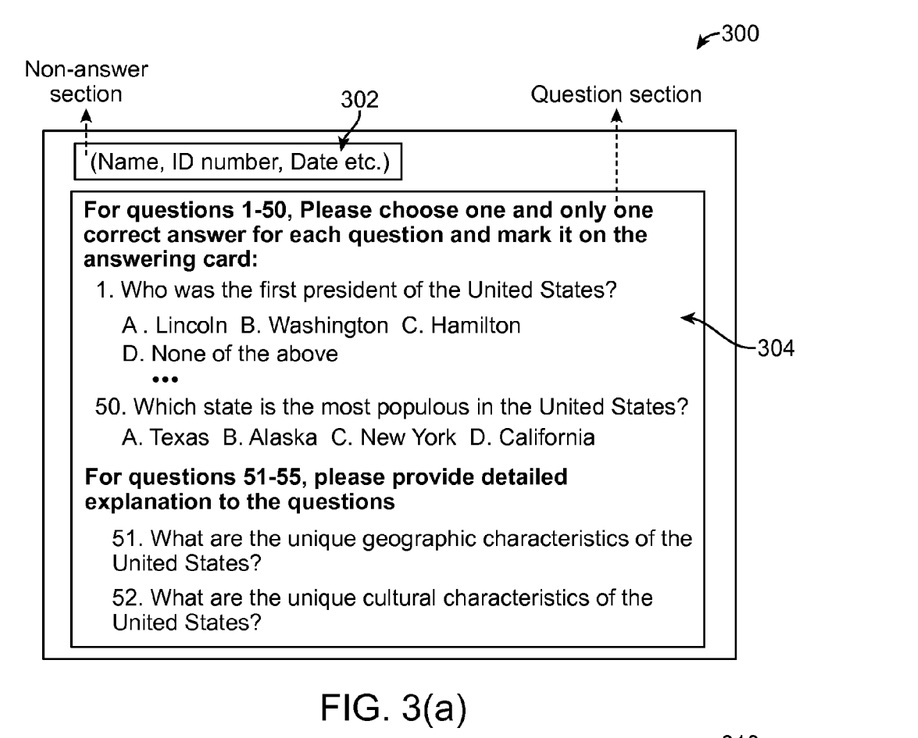
FIG. 3(a) is an exam paper in accordance with an exemplary embodiment.

FIG. 3(a) is an exam paper 300 in accordance with an exemplary embodiment. As shown in FIG. 3(a), the exam paper can include a non-answer section 302, for example, name, identification (ID) number, date, etc., and a question and/or answer section 304. The question section 304 can include, for example, multiple choice questions, and/or fill in the blank questions. In addition, it can be appreciated that the non-answer section 302 can include, for example, the multiple choice questions, and the question and/or answer section 304 can include only the answer portion. For example, the questions can be in the non-answer section 302 and the answers to the questions can be placed in an answer only section 304. Alternatively, the non-answer section can include, for example, name, ID number, etc. and the answer section 304, can include an answer only section or "answer card", and wherein the questions can be provided in a separate booklet and/or sheet.

Figure 3B:
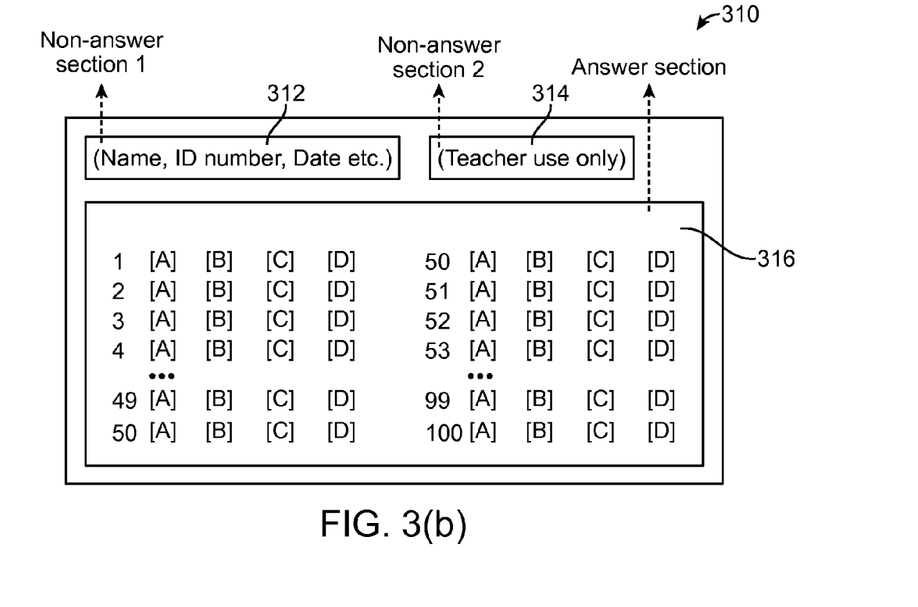
FIG. 3(b) is an illustration of an answer card in accordance with an exemplary embodiment.

FIG. 3(b) is an illustration of an answer card 310 in accordance with an exemplary embodiment. As shown in FIG. 3(b), the answer card 310 can also include one or more non-answer sections 312, 314, for example, name, identification (ID) number, date, etc., and an answer section 316. The answer section 316, can be filled in and/or circled when an answer is selected, for example, a, b, c, and d.

Figure 4:
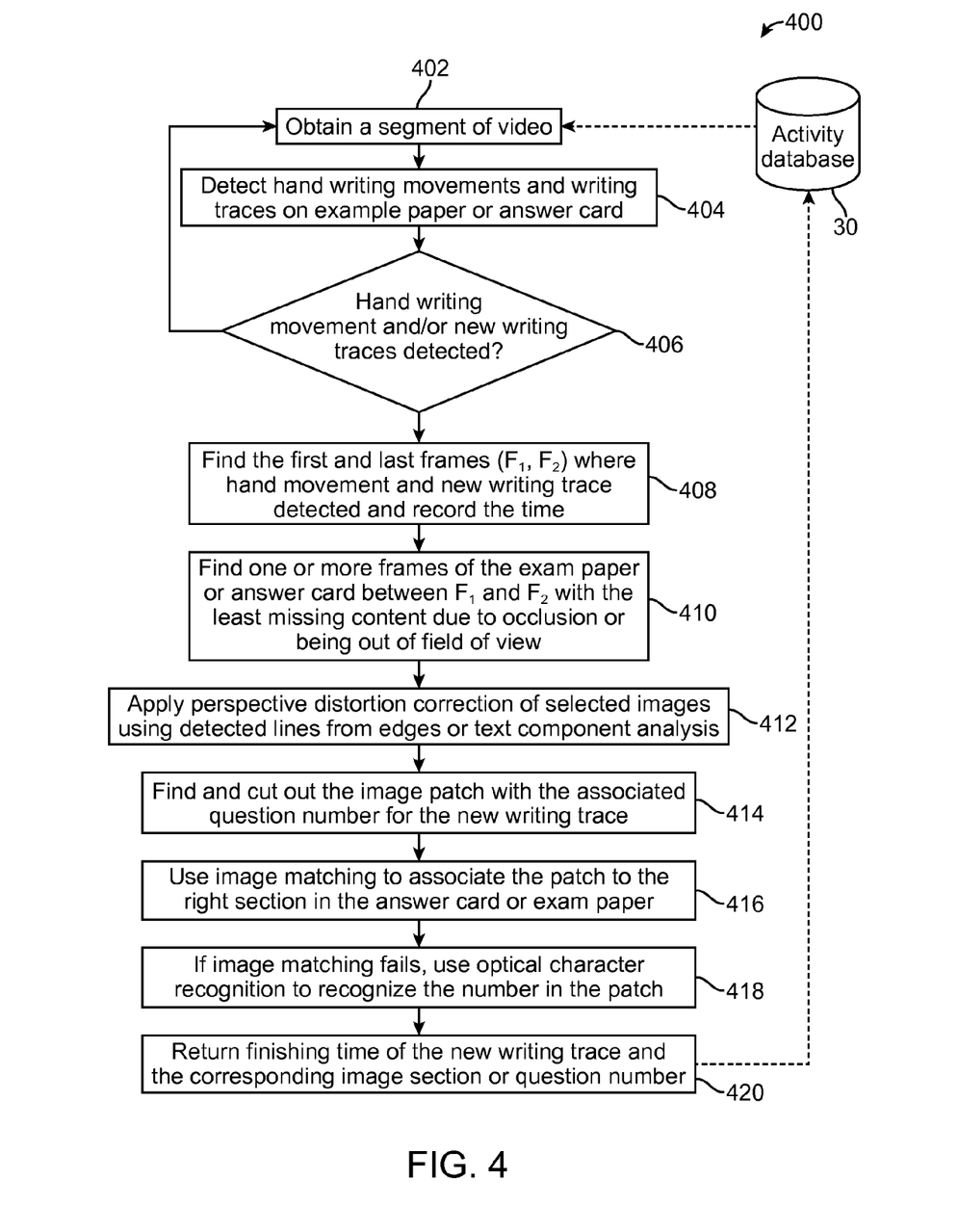
FIG. 4 is a workflow for computing finishing time of new writing traces in accordance with an exemplary embodiment.

FIG. 4 is a workflow 400 for computing finishing time of new writing traces in accordance with an exemplary embodiment. In step 402, a segment of video (or videos images) is obtained. In step 404, if hand writing movements and writing traces are detected, for example, on an exam paper or an answer card (FIG. 6), the process proceeds to step 406, wherein a determination can be made, if the hand writing movement and/or new writing traces can be detected. If movement and/or new writing traces are detected, in step 408, the time for the first and last frames ($F_1$, $F_2$) where hand movement and/or new writing trace detected are recorded.

In step 410, one or more frames of the exam paper or answer card between the first frame ($F_1$) and the last frame ($F_2$) having the least missing content are identified. For example, the missing content can be due to occlusion or being out of the field of view. In step 412, perspective distortion correction of selected images using detected lines from edges or text component analysis can be applied to those identified frames having the least missing content.

In accordance with an exemplary embodiment, the perspective distortion correction in step 412 can be made by determining if a good quadrilateral for the selected images can be obtained based on the image or frame. For example, a good quadrilateral can be one that is likely formed by the boundaries of the exam paper and/or answer card, and/or, for example, based on one or more of the following criteria: height, width, aspect ratio, and location of the exam paper and/or answer card, minimum and maximum perspective angles of the camera, and/or minimum and maximum viewing distances of the cameras. In accordance with an exemplary embodiment, the criteria can be based on an assumption that the exam paper and/or answer card is rectangular.

If the determination is made that a good quadrilateral for the selected images can be made, perspective parameters using best quadrilateral for the selected images can be estimated, for example, by using a method such as disclosed in Liebowitz, D.; Zisserman, A, "Metric rectification for perspective images of planes," *IEEE Computer Society Conference on Computer Vision and Pattern Recognition*, pp. 23-25, 1998, and the distortion for each selected images can be corrected. If a good quadrilateral for the selected images cannot be achieved, a determination if two dominant line directions and orthogonal lines can be achieved can be made. The perspective parameters using orthogonal line pairs can then be performed, and since orthogonal lines form a right angle, this can be done using an established method, for example, as disclosed in Liebowitz, wherein the distortion for each of the selected images can be corrected.

In accordance with an exemplary embodiment, the perspective distortion correction in step 412 can also be corrected using text components. For example, as disclosed above for edge detection, one can assume that the text or written content on the exam paper or answer card is horizontally and vertically aligned. Thus, the lines formed by the centroids of each of the letters are supposed to be straight, and the vertical and horizontal to be orthogonal. In accordance with an exemplary embodiment, the perspective parameters using orthogonal line pairs can then be performed, and since orthogonal lines form a right angle, this can be done using an established method, for example, as disclosed in Liebowitz, wherein the distortion for each of the selected images can be corrected based on the text or written content.

In step 414, an image patch with the associated question number for the new writing trace can be generated. In step 416, image matching can be used to associate the image patch to the correct section of the answer card or examination paper. In step 418, if image matching fails, optical character recognition can be used to recognize the question number in the patch. The question number is typically at a top-left position of a paragraph, as illustrated in FIG. 3(a), which can help distinguish the question number form other numbers embedded in the question itself. In step 420, the finishing time of the new writing trace and the corresponding image section or question number can be provided to the activity database 30.

Figure 5:
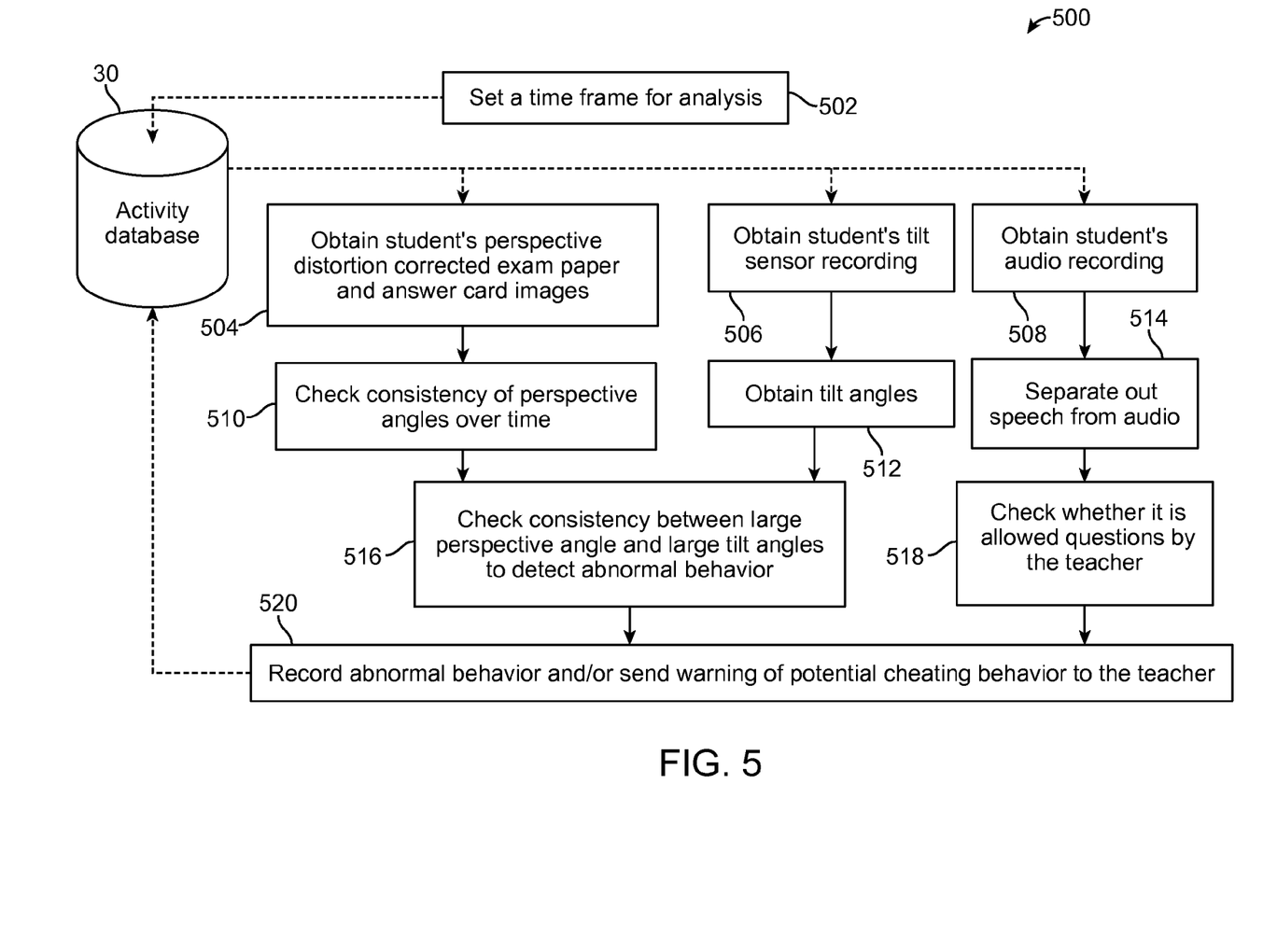
FIG. 5 is a workflow for detecting potential cheating behavior in accordance with an exemplary embodiment.

FIG. 5 is a workflow 500 for detecting potential cheating behavior in accordance with an exemplary embodiment. As shown in FIG. 5, in step 502, a time frame for the analysis is set. In step 504, one or more student's perspective distortion corrected exam paper and/or answer card images are obtained. In step 510, consistency of perspective angles over the time frame is checked. In step 506, the one or more student's tilt sensor recording can be obtained. In step 512, tilt angles are obtained. In step 516, consistency between large perspective angles and large tilt angles to detect abnormal behavior can be checked.

In accordance with an exemplary embodiment, in step 508, the one or more student's audio recording can also be obtained. In step 514, speech is separated from the audio. In step 518, a check can be performed to determine whether questions were allowed by the teacher. In step 520, abnormal behavior can be recorded and/or a warning of potential cheating behavior can be sent to the teacher based on consistency between large perspective angles and large tilt angles in step 516 and speech and questions in steps 514 and 518.

Figures 6A, 6C:
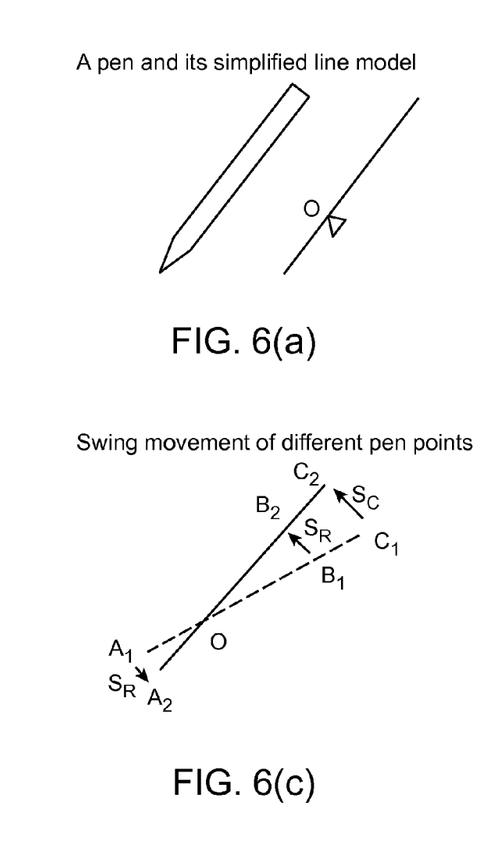
FIGS. 6(a)-6(d) are illustrations of models of a pen and correspond swing movements of the pen during writing in accordance with an exemplary embodiment.
Figures 6B, 6D:
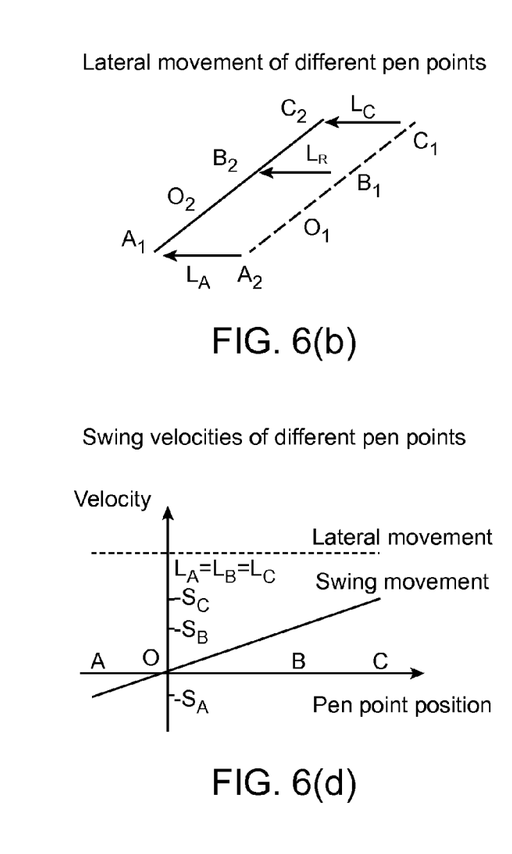

FIGS. 6(a)-6(d) are illustration of models of a pen and swing movements of the pen during writing. For example, as shown in FIG. 6(a), drawing of a pen (left) and its lever model during writing in a video (right), where O is the supporting point of the fingers of the user. FIG. 6(b) illustrates lateral movement of a pen, wherein the points $A_1$, $B_1$ and $C_1$ moves to $A_2$, $B_2$ and $C_2$ in velocities $L_A$, $L_B$ and $L_C$, respectively, and wherein the velocity directions and magnitudes of all points are similar. FIG. 6(c) illustrates swing movement of a pen, wherein the points $A_1$, $B_1$ and $C_1$ moves to $A_2$, $B_2$ and $C_2$ in velocities $S_A$, $S_B$ and $S_C$, respectively, and wherein the velocity direction and magnitude of each point depend on its relative position to the supporting point O. FIG. 6(d) illustrates the velocity vs. pen point relative position to the supporting point O.

In accordance with an exemplary embodiment, a pen (or pencil) in a short segment of video can be simplified as lever for the purpose of writing movement tracking. For example, as shown in FIG. 6(a), a movement of a pen during writing can be decomposed into two separate components, one is lateral movement as illustrated in FIG. 6(b) and the other swing movement as illustrated in FIG. 6(c). If no swing movement is detected in the segment of video, there is no writing activities, otherwise, the beginning and ending of continuous swing movements are treated the same as those of writing activities. For example, in order to obtain the pen movement information, pen-hand region need to be detected first (Kolsch, M.; Turk, M., "Robust hand detection," *Sixth IEEE International Conference on Automatic Face and*

Gesture Recognition, pp. 17-19, 2004), the pen can then be separated from the hand using color and shape information.

In order to detect new writing traces on exam paper or answer card, the regions containing exam paper or answer card can be extracted from a short segment of video and matched, for example, using local features, as disclosed in co-pending application entitled "Method and System for Enhancing Interactions between Teachers and Students", Ser. No. 14/230,949, then forward-difference (something appears in current frame but in none of the previous frames) detection can be carried out to detect new writing traces.

In accordance with an exemplary embodiment, a computer program product comprising a non-transitory computer readable medium having a computer readable code embodied therein for analyzing exam-taking behavior and improving exam-taking is disclosed, the computer readable program code configured to execute a process, which includes the steps of: obtaining a student answering sequence and timing to an examination having a series of questions; comparing the student answering sequence and timing with results from a statistic analysis of the examination obtained from a plurality of students; and identifying an abnormality in the student answering sequence and timing according to the comparison.

The non-transitory computer usable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

The present invention includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to".

In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure.

In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A method for analyzing exam-taking behavior and improving exam-taking skills, the method comprising:
   receiving video images, during a taking of an examination, from a multi-functional device configured to be worn by a student, of text or written content of an examination paper and/or an answer card, and wherein the examination paper and/or the answer card is a paper-based examination having an answer section for each of a plurality questions;
   obtaining a student answering sequence and timing to the examination paper and/or answer card from the video images of the text or written content of the examination paper and/or the answer card received from the multi-functional device, wherein the obtaining of the student answering sequence and timing to the examination paper and/or the answer card comprises:
      detecting a plurality of time intervals from the video images to determine when the student places an answer in the answer section for each of the plurality of questions of the paper-based examination by detecting hand movement and writing traces from the video images; and
      calculating each of the plurality of time intervals based on a time interval from a first frame and a last frame having hand movement and writing traces for each of the plurality of questions on the examination paper and/or the answer card;
   comparing the student answering sequence and timing with results from a previously computed statistical analysis of the examination paper and/or the answer card obtained from a plurality of students;
   identifying abnormalities in the student answering sequence and timing according to the comparison; and
   providing feedback to the student and/or a teacher when an abnormality in the student answering sequence and timing is identified.

2. The method of claim 1, comprising:
   obtaining the student answering sequence and timing to the examination paper and/or the answer card for a plurality of students, each of the plurality of students having a head-mounted multi-functional device with at least a front facing camera and a wireless transmitter for transmitting the videos images of the student answering sequence and timing to the examination paper and/or the answer card;
   comparing the student answering sequence and timing with results from a statistic analysis of the examination paper and/or the answer card obtained from the plurality of students; and
   identifying abnormalities for the plurality of students according to the comparison.

3. The method of claim 1, comprising:
   determining when one or more frames from the video images is missing content;
   applying a perspective distortion correction of selected images using line detection from edges or text components for each of the plurality of questions on the examination paper and/or the answer card in which the video images is missing content;

generating an image patch with an associated question number for a new writing trace associated with the plurality of questions on the examination paper and/or the answer card in which the video images is missing content;

associating the image patch to a section of the examination paper and/or the answer card using image matching, and when image matching fails, using optical character recognition to recognize a question number in the image patch;

providing a finish time for the new writing trace; and generating a student's distortion corrected image of the examination paper and/or the answer card.

4. The method of claim 3, wherein the multi-functional device is equipped with a tilt sensor configured to detect changes in a relative position of the multi-functional device, and inputting a tilt reading into the computer from the tilt sensor from the student; and detecting when the student exhibits significant changes in the tilt reading.

5. The method of claim 4, comprising:

obtaining the student's perspective distortion corrected examination; and checking consistency of perspective angles with the tilt readings.

6. The method of claim 5, wherein the multi-functional device is equipped with an audio device and obtaining segments of audio from the multi-functional device;

segmenting each of the segments of audio into one or more individual segments;

classifying each of the segments of audio into speech and non-speech units; and classifying each of the speech units as normal behavior or abnormal behavior.

7. The method of claim 6, comprising:

assigning a confidence level to each of the plurality of time intervals by determining if the region of interest from the video images is consistent with solving the question during a corresponding time interval;

sending a warning of abnormal behavior when the confidence level assigned to each of the time intervals images for more than a predetermined threshold is not consistent with solving the question during a corresponding time interval;

sending the warning when the speech units are classified as abnormal behavior; and sending the warning when the student exhibits significant changes in the tilt reading.

8. The method of claim 1, further comprising:

providing the feedback to the student during the taking of the examination.

9. The method of claim 1, further comprising:

providing the feedback to the student after the taking of the examination.

10. A computer program product comprising a non-transitory computer readable medium having a computer readable code embodied therein for analyzing exam-taking behavior and improving exam-taking, the computer readable program code configured to execute a process, which includes the steps of:

receiving video images, during a taking of an examination, from a multi-functional device configured to be worn by a student, of text or written content of an examination paper and/or an answer card, and wherein the examination paper and/or the answer card is a paper-based examination having an answer section for each of a plurality questions;

obtaining a student answering sequence and timing to the examination paper and/or answer card from the video images of the text or written content of the examination paper and/or the answer card received from the multi-functional device, wherein the obtaining of the student answering sequence and timing to the examination paper and/or the answer card comprises:

detecting a plurality of time intervals from the video images to determine when the student places an answer in the answer section for each of the plurality of questions of the paper-based examination by detecting hand movement and writing traces from the video images; and calculating each of the plurality of time intervals based on a time interval from a first frame and a last frame having hand movement and writing traces for each of the plurality of questions on the examination paper and/or the answer card;

comparing the student answering sequence and timing with results from a statistic previously computed statistical analysis of the examination paper and/or the answer card obtained from a plurality of students;

identifying abnormalities in the student answering sequence and timing according to the comparison; and providing feedback to the student and/or a teacher when an abnormality in the student answering sequence and timing is identified.

11. The computer program product of claim 10, determining when one or more frames from the video images is missing content;

applying a perspective distortion correction of selected images using line detection from edges or text components for each of the plurality of questions on the examination paper and/or the answer card in which the video images is missing content;

generating an image patch with an associated question number for a new writing trace associated with the plurality of questions on the examination paper and/or the answer card in which the video images is missing content;

associating the image patch to a section of the examination paper and/or the answer card using image matching, and when image matching fails, using optical character recognition to recognize a question number in the image patch; providing a finish time for the new writing trace; and generating a student's distortion corrected image of the examination paper and/or the answer card.

12. The computer program product of claim 11, wherein the multi-functional device is equipped with a tilt sensor configured to detect changes in a relative position of the multi-functional device, and inputting a tilt reading into the computer from the tilt sensor from the student;

detecting when the student exhibits significant changes in the tilt reading;

obtaining the student's perspective distortion corrected examination; and checking consistency of perspective angles with the tilt readings.

13. The computer program product of claim 12, wherein the multi-functional device is equipped with an audio device and obtaining segments of audio from the multi-functional device;

segmenting each of the segments of audio into one or more individual segments;

classifying each of the segments of audio into speech and non-speech units;

classifying each of the speech units as normal behavior or abnormal behavior;

assigning a confidence level to each of the plurality of time intervals by determining when the region of interest from the video images is consistent with solving the question on the examination paper and/or the answer card during a corresponding time interval;

sending a warning of abnormal behavior when the confidence level assigned to each of the time intervals images for more than a predetermined threshold is not consistent with solving the question on the examination paper and/or the answer card during a corresponding time interval;

sending the warning when the speech units are classified as abnormal behavior; and sending the warning when the student exhibits significant changes in the tilt reading.

14. The computer program product of claim 10, further comprising:
providing the feedback to the student during the taking of the examination.

15. The computer program product of claim 10, further comprising:
providing the feedback to the student after the taking of the examination.

16. A system for analyzing exam-taking behavior and improving exam-taking skills the system comprising:
at least one multi-functional device having a video camera and configured to be worn by a student to obtain video images, during a taking of an examination, of text or written content of an examination paper and/or an answer card, and wherein the examination paper and/or the answer card is a paper-based examination; and
a computer having a processor configured to:
obtain a student answering sequence and timing to the examination paper and/or answer card from the video images of the text or written content of the examination paper and/or the answer card received from the multi-functional device, wherein the obtaining of the student answering sequence and timing to the examination paper and/or the answer card comprises:
detecting a plurality of time intervals from the video images to determine when the student places an answer in the answer section for each of the plurality of questions of the paper-based examination by detecting hand movement and writing traces from the video images; and
calculating each of the plurality of time intervals based on a time interval from a first frame and a last frame having hand movement and writing traces for each of the plurality of questions on the examination paper and/or the answer card;
compare the student answering sequence and timing with results from a statistic previously computed statistical analysis of the examination paper and/or the answer card obtained from a plurality of students;
identify abnormalities in the student answering sequence and timing according to the comparison; and
provide feedback to the student and/or a teacher when an abnormality in the student answering sequence and timing is identified.

17. The system of claim 16, wherein the processor of the computer is further configured to:
determine when one or more frames from the video images is missing content;
apply a perspective distortion correction of selected images using line detection from edges or text components for each of the plurality of questions on the examination paper and/or the answer card in which the video images is missing content;
generate an image patch with an associated question number for a new writing trace associated with the plurality of questions on the examination paper and/or the answer card in which the video images is missing content;
associate the image patch to a section of the examination paper and/or the answer card using image matching, and when image matching fails, using optical character recognition to recognize a question number in the image patch;
providing a finish time for the new writing trace; and
generate a student's distortion corrected image of the examination paper and/or the answer card.

18. The system of claim 17, wherein the multi-functional device is equipped with a tilt sensor configured to detect changes in a relative position of the multi-functional device, and inputting a tilt reading into the computer from the tilt sensor from the student; and
wherein the processor of the computer is configured to:
detect when the student exhibits significant changes in the tilt reading;
obtain the student's perspective distortion corrected examination; and
check consistency of perspective angles during with the tilt readings.

19. The system of claim 18, wherein the multi-functional device is equipped with an audio device and obtaining segments of audio from the multi-functional device; and
wherein the processor of the computer is configured to:
segment each of the segments of audio into one or more individual segments;
classify each of the segments of audio into speech and non-speech units;
classify each of the speech units as normal behavior or abnormal behavior;
assign a confidence level to each of the plurality of time intervals by determining when the region of interest from the video images is consistent with solving the question on the examination during a corresponding time interval;
send a warning of abnormal behavior when the confidence level assigned to each of the time intervals images for more than a predetermined threshold is not consistent with solving the question on the examination paper and/or the answer card during a corresponding time interval;
send the warning when the speech units are classified as abnormal behavior; and
send the warning when the student exhibits significant changes in the tilt reading.

20. The system of claim 16, further comprising:
providing the feedback to the student during the taking of the examination.

* * * * *